(12) United States Patent
Kury et al.

(10) Patent No.: US 9,447,904 B2
(45) Date of Patent: Sep. 20, 2016

(54) HOSE COUPLING

(71) Applicant: Neoperl GmbH, Mullheim (DE)

(72) Inventors: Werner Kury, Mullheim (DE); Michael Scherer, Schallstadt-Mengen (DE)

(73) Assignee: NEOPERL GMBH, Mullheim (DE)

( * ) Notice: Subject to any disclaimer, the term of this patent is extended or adjusted under 35 U.S.C. 154(b) by 0 days.

(21) Appl. No.: 14/688,956

(22) Filed: Apr. 16, 2015

(65) Prior Publication Data

US 2015/0226356 A1 Aug. 13, 2015

Related U.S. Application Data

(63) Continuation-in-part of application No. 14/274,207, filed on May 9, 2014, which is a continuation-in-part of application No. 13/203,924, filed as application No. PCT/EP2010/001057 on Feb. 19, 2010, now Pat. No. 8,752,867.

(30) Foreign Application Priority Data

| Mar. 3, 2009 | (DE) | ........................ | 10 2009 011 411 |
| Apr. 19, 2014 | (DE) | ........................ | 10 2014 005 837 |
| Apr. 19, 2014 | (DE) | ........................ | 20 2014 003 383 |
| Aug. 2, 2014 | (DE) | ........................ | 10 2014 011 583 |

(51) Int. Cl.
*F16L 33/207* (2006.01)
*E03C 1/02* (2006.01)

(52) U.S. Cl.
CPC .......... *F16L 33/207* (2013.01); *F16L 33/2076* (2013.01); *E03C 1/025* (2013.01)

(58) Field of Classification Search
CPC .... F16L 33/207; F16L 33/2076; E03C 1/025
USPC .................................................. 285/256, 259
See application file for complete search history.

(56) References Cited

U.S. PATENT DOCUMENTS

| 1,678,640 | A | 7/1928 | Hall |
| 2,139,745 | A | 12/1938 | Goodall |
| 2,230,115 | A | 1/1941 | Kreidel |
| 2,371,971 | A | 3/1945 | Main et al. |
| 3,237,974 | A | 3/1966 | Press |
| 3,530,900 | A | 9/1970 | Kish |
| 4,330,142 | A | 5/1982 | Paini |
| 4,603,888 | A | 8/1986 | Goodall et al. |
| 4,817,997 | A | 4/1989 | Ingram |

(Continued)

FOREIGN PATENT DOCUMENTS

| DE | 19936413 C1 | 3/2001 |
| FR | 2894011 A1 | 6/2007 |

(Continued)

*Primary Examiner* — David E Bochna
(74) *Attorney, Agent, or Firm* — Volpe and Koenig, P.C.

(57) ABSTRACT

A hose coupling is provided, which is of sleeve-shaped form and which, at at least one coupling end, has a connector with a retention profiling provided on the outer circumference at least in one connector subregion, onto which coupling end a hose end of a flexible hose can be pushed. The retention profiling is formed by at least one retention groove, which is provided on the outer circumference of the connector and which has groove long sides oriented in the connector circumferential direction and groove narrow sides oriented in the connector longitudinal direction. The at least one retention groove has a groove base which is of flat form.

13 Claims, 6 Drawing Sheets

(56) References Cited

U.S. PATENT DOCUMENTS

| | | |
|---|---|---|
| 5,165,733 A | 11/1992 | Sampson |
| 5,487,571 A | 1/1996 | Robertson |
| 5,853,202 A | 12/1998 | Li et al. |
| 6,318,763 B1 | 11/2001 | Huang |
| 6,394,506 B1 | 5/2002 | Street |
| 6,715,800 B1 | 4/2004 | Hennig |
| 6,874,823 B2 | 4/2005 | Viegener |
| 7,364,206 B2 | 4/2008 | Romanelli et al. |
| 7,849,884 B2 | 12/2010 | Dickel |
| 8,752,867 B2 | 6/2014 | Mager et al. |
| 2010/0194100 A1 | 8/2010 | Koch |

FOREIGN PATENT DOCUMENTS

| | | |
|---|---|---|
| JP | 8226589 A | 9/1996 |
| WO | 201413984 A1 | 9/2014 |

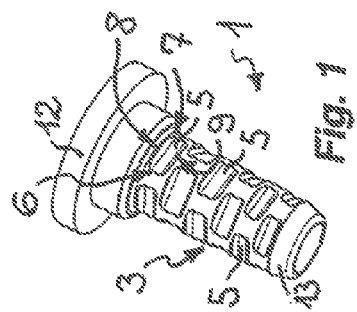
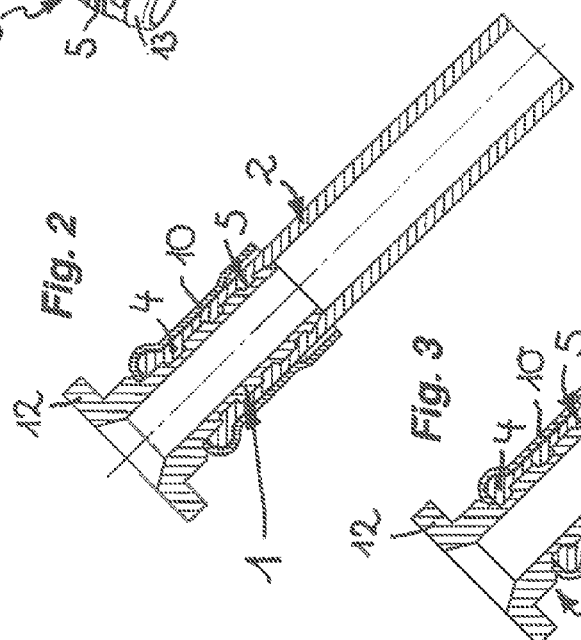
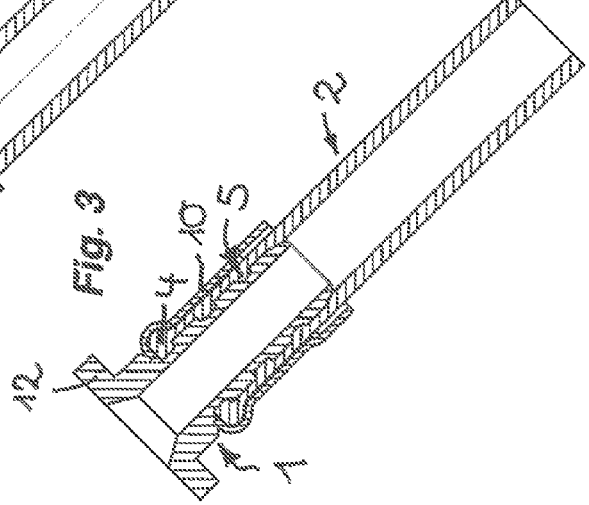
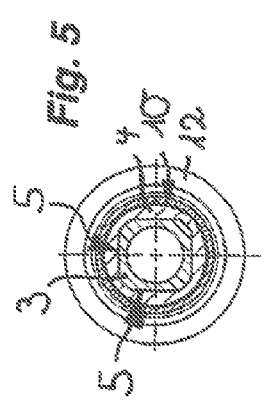
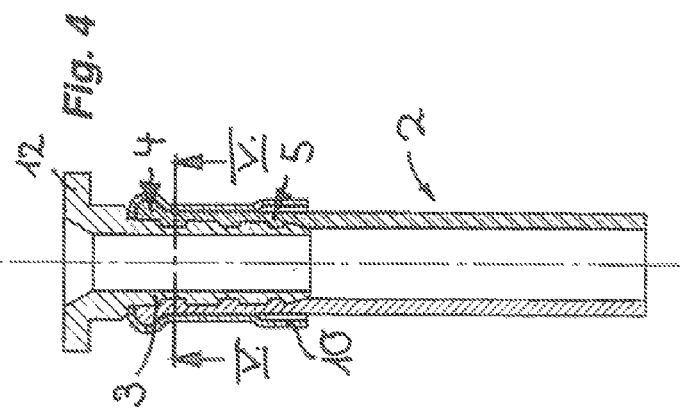

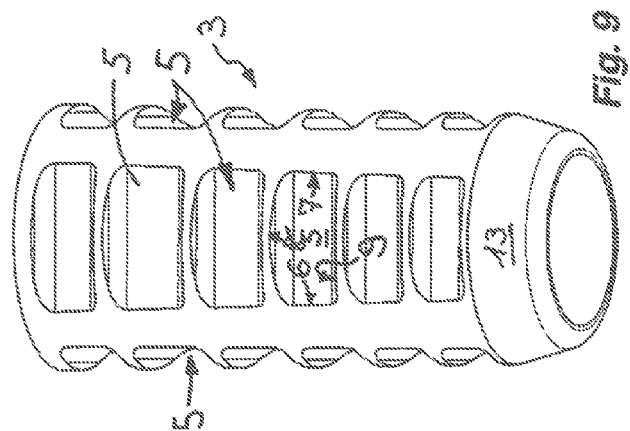
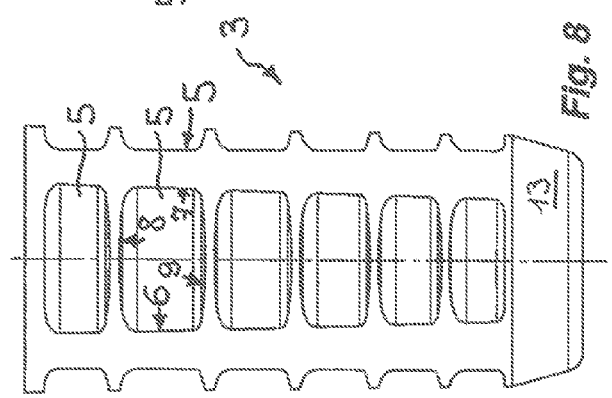
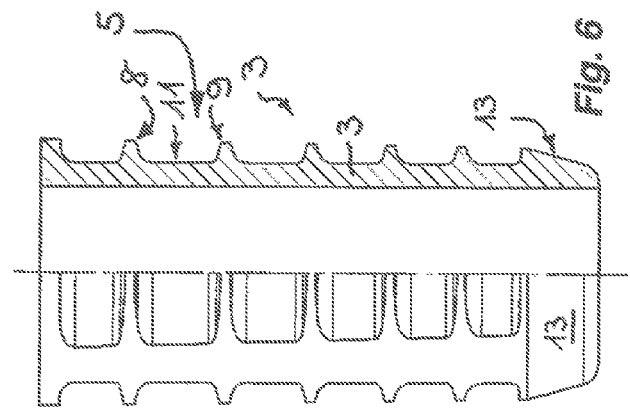
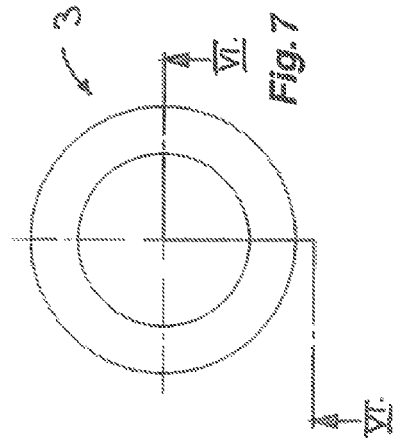

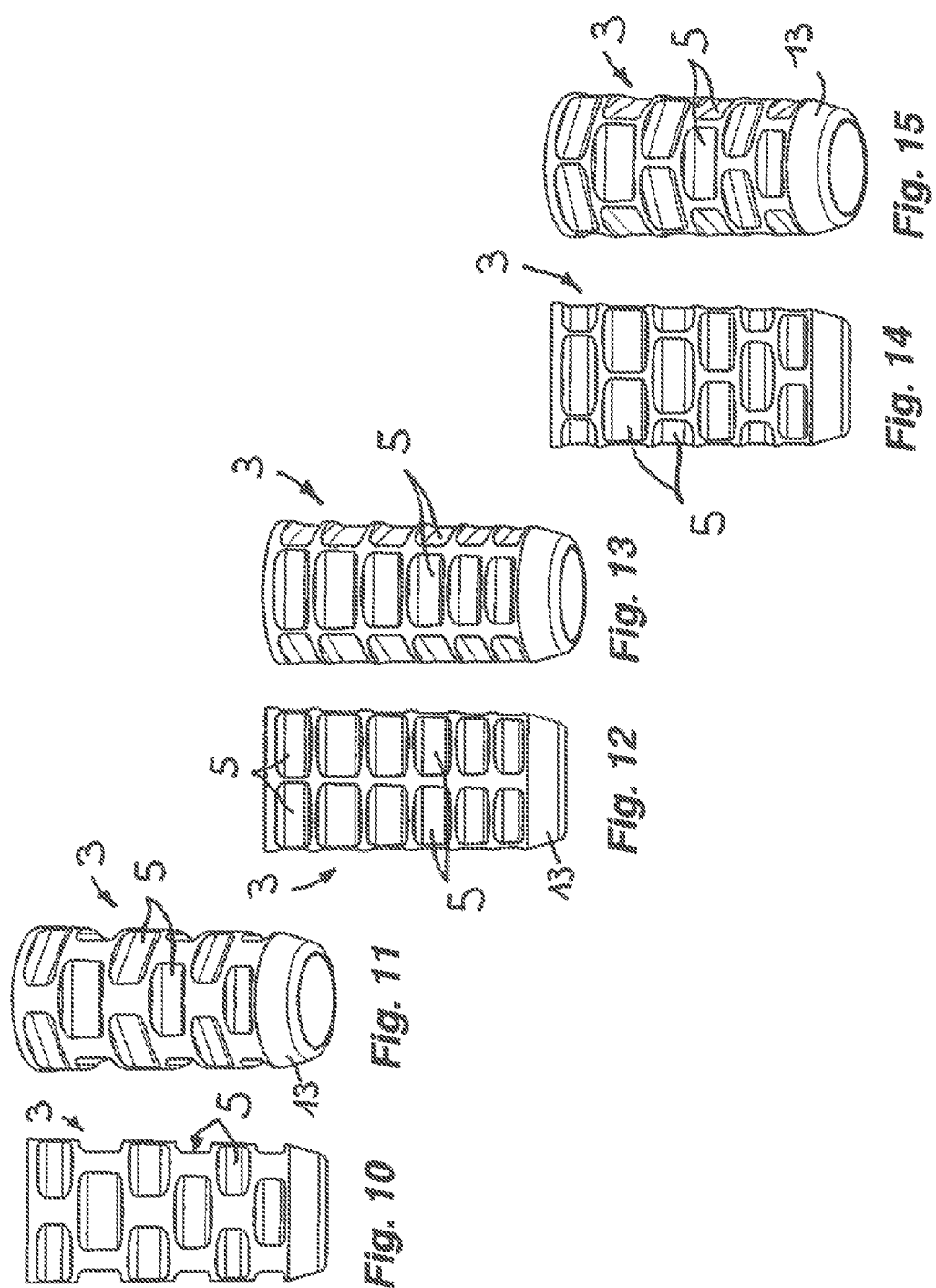

HOSE COUPLING

INCORPORATION BY REFERENCE

The present application is a Continuation-in-Part of U.S. patent application Ser. No. 14/274,207, filed May 9, 2014, now U.S. Pat. No. 9,261,213, which is a Continuation-in-Part of U.S. patent application Ser. No. 13/203,924, filed Aug. 30, 2011, now U.S. Pat. No. 8,752,867, which is a §371 National Phase of PCT/EP10/10157, filed Feb. 19, 2010, which claimed priority of German Patent Application No. 10 2009 011411.4, Filed Mar. 3, 2009. U.S. patent application Ser. No. 14/274,207 also claimed benefit of German Patent Application No. 10 2014 005 837.9 filed Apr. 19, 2014. The present application also claims benefit of German Patent Application No. 10 2014 011 583.6, filed Aug. 2, 2014, which claims benefit of German Patent Application No. 10 2014 003383.8, filed Apr. 19, 2014. The entire contents of all of the aforementioned applications are included by reference herein as if fully set forth.

FIELD OF THE INVENTION

The invention relates to a hose coupling which is of sleeve-shaped form and which, at at least one coupling end, has a connector with a retention profiling provided on the outer circumference at least in one connector subregion, onto which coupling end a hose end of a flexible hose can be pushed.

BACKGROUND

In the sanitary sector, instead of thin copper pipes, increasing use is being made of flexible hose lines for effecting the supply of water for example from an angle valve to a wash basin or similar water consumption point. To connect the flexible hose to the angle valve or similar water supply line and/or to the water consumption point, a hose coupling of the type mentioned in the introduction is required.

The known hose couplings are generally of sleeve-shaped form and have a connection thread or a sleeve nut on one end thereof, whereas a connector is provided on the other coupling end. Said connector has a retention profiling on the outer circumference at least in one connector subregion, such that one of the two hose ends of a flexible hose can be pushed onto said profiled coupling end. Said retention profiling is commonly formed from at least one annular flange which, toward its outer circumference, tapers in the direction of the free connector end such that the hose end can be pushed on easily. A disadvantage is however that an annular flange which narrows to a point at the outer circumference acts as an encircling cutting edge. If a torque is exerted on the hose line and the connector is rotated relative to the hose line, there is the risk of the at least one annular flange cutting into the hose inner circumference of the hose line, which can result in a leak or in reduced bursting resistance of the hose line.

U.S. Pat. No. 4,330,142 has already disclosed a sleeve-shaped hose coupling of the type mentioned in the introduction which, at at least one coupling end, has a connector which bears a retention profiling on the outer circumference in at least one connector subregion, wherein the hose end of a flexible hose can be pushed onto the coupling end in the form of a connector. The retention profiling is pressed into the coupling end by cold working by way of stamping punches. Said stamping punches are arranged at uniform intervals around the coupling end on common circumferential lines and are moved in a radial direction toward the coupling end until the concavely rounded stamping tips of each stamping punch stamps in each case an approximately rectangular groove into the coupling end, wherein the displaced material between the grooves is raised to form a ridge which separates the grooves from one another. The relatively narrow ridges between the grooves are scarcely capable of absorbing and transmitting relatively high torques. An undesired rotation of the hose coupling relative to the hose end is furthermore abetted in that the groove base of each groove is of convex form owing to the selected production method.

Also known is another sleeve-shaped hose coupling with a connector which has an annular flange which tapers to a point counter to the pushing-on direction (cf. DE 196 50 022 C1). The hose end which is pushed onto the connector over the annular flange is secured by means of a clip which engages around the outer circumference of the hose end and which forces the hose end against a connector subregion which has square depressions arranged on circumferential lines situated adjacent to one another in an axial direction, which depressions are delimited by webs running around the hose connector and by transverse webs which connect the webs to one another. Such a retention profiling is also not capable of transmitting relatively high torques; furthermore, a hose coupling of said type cannot be practically produced by way of a cutting manufacturing process.

FR-A-816 069 has disclosed a similar hose coupling with a connector which, on its connector end region intended for having a hose end pushed thereon, has multiple encircling retention ribs which are spaced apart from one another, wherein, on that connector end region which has the retention ribs, there is situated a connector subregion which likewise has square depressions arranged on circumferential lines situated adjacent to one another in an axial direction, which depressions are delimited by encircling webs and by transverse webs which connect the webs to one another. Said hose coupling, too, cannot be practically produced by way of a cutting machining process, and is likewise not capable of transmitting high torques.

The problem is therefore that of providing a hose coupling of the type mentioned in the introduction which, even in the event of a rotational movement of the hose line in relation to the connector, continues to ensure an intense sealing action and high load-bearing capacity.

SUMMARY

The solution according to the invention to said problem consists, in the case of the hose coupling of the type mentioned in the introduction, in the features of the current patent claim 1.

In the case of the hose coupling according to the invention, the retention profiling is formed by at least one retention groove which is provided on the outer circumference of the connector. The retention groove, which is provided as a recess on the connector outer circumference, has groove long sides oriented in the connector circumferential direction and groove narrow sides oriented in the connector longitudinal direction. The inner circumferential elastic material of the flexible hose is displaced into said at least one retention groove such that a positively locking connection with high load-bearing capacity between the connector and the hose end of the flexible hose line is ensured. In this case, the inner circumference of the hose end bears against the outer circumference, which bears the retention grooves, of the connector. Since it is possible for protruding annular flanges which taper at the outer circumference to be omitted, a stability-reducing incision into the hose inner circumference is not necessary. To also be able to transfer a higher torque to the between the connector and the hose end pushed onto the connector, it is provided according to the invention that the at least one retention groove has a groove base which is of flat form. Such a non-circular connecting region between the connector, on the one hand, and the hose line pushed onto said connector, on the other hand, can also have higher torques transmitted and dissipated thereto. The hose coupling according to the invention is then characterized by an intense sealing action and high load-bearing capacity and bursting resistance even if the hose line is rotated in relation to the hose coupling.

A preferred embodiment according to the invention provides that the connector has the retention profiling in a connector subregion facing away from the coupling end, and that at least one retention rib oriented in the connector circumferential direction is provided between said retention profiling and the coupling end.

The hose coupling designed in accordance with this invention proposal is also of sleeve-shaped form and also has, at at least one coupling end, a connector with a retention profiling provided on the outer circumference at least in one connector subregion. On the connector of the hose coupling in accordance with this invention proposal, a retention profiling is provided on that connector subregion which faces away from the coupling end, which retention profiling is likewise formed by at least one retention groove which is provided on the outer circumference of the connector and which has groove long sides oriented in the connector circumferential direction and groove narrow sides oriented in the connector longitudinal direction. In this case, at least one retention rib oriented in the connector circumferential direction is provided between said retention profiling and the coupling end. In the case of this hose coupling according to the invention, it is possible for the connector to now be of considerably shorter form, which yields an enormous material saving. In this case, the hose coupling designed in accordance with this invention proposal can exert high axial retention forces on the hose end, pushed onto the connector, of a flexible hose line, and can at the same time also absorb any torsional retention forces to be transmitted between the hose line, on the one hand, and the hose coupling, on the other hand.

The at least one retention rib provided on the hose coupling according to the invention may be formed with interruptions at preferably uniform intervals. However, to simplify the production of the hose coupling according to the invention, it is advantageous for the at least one retention rib to be of encircling form.

To make it possible for the highest possible axial retention forces to be transmitted between the hose coupling according to the invention and the hose in the hose longitudinal direction, it is advantageous for at least two retention ribs which are spaced apart from one another to be provided between the retention profiling and the coupling end.

In order that the retention grooves do not merge into one another, it is advantageous for the retention profiling to have at least two retention grooves, the adjacent groove narrow sides of which are spaced apart from one another. If the groove narrow sides of the mutually adjacent retention grooves are spaced apart from one another, a rotational movement between the connector, on the one hand, and the hose end pushed onto said connector, on the other hand, is reliably prevented.

The possibility of even high torques being transmitted to the connection provided between the connector and hose line is further promoted if the retention profiling has at least two retention grooves arranged on a common circumferential line.

In this case, a particularly simple embodiment according to the invention that can be produced with relatively little outlay provides that the retention grooves arranged on a common circumferential line are arranged so as to be distributed over the connector circumference at uniform intervals.

The simple producibility and the high load-bearing capacity of the connection provided with the hose coupling according to the invention between connector and hose end is particularly strong and capable of bearing load if the retention grooves arranged on a common circumferential line define a substantially triangular, square, hexagonal or polygonal connector cross section.

To provide the retention profiling according to the invention over as long a connector subregion as possible, it may be expedient if, in at least one subregion of the connector, retention grooves are provided so as to be arranged on at least two circumferential lines, and if the groove long sides, which face toward one another, of the retention grooves arranged on adjacent circumferential lines are spaced apart from one another.

In this case, one embodiment of the invention provides that the retention grooves arranged on adjacent circumferential lines are provided in lines arranged axially parallel to the connector longitudinal axis.

An embodiment according to the invention that differs from this provides that the retention grooves arranged on adjacent circumferential lines are arranged offset with respect to one another. In this case, it is particularly advantageous for the retention grooves arranged on adjacent circumferential lines to be arranged offset with respect to one another such that adjacent groove narrow sides of retention grooves arranged on a common circumferential line are arranged approximately centrally with respect to a retention groove provided on an adjacent circumferential line.

In order that the free hose end can be pushed easily onto the connector, designed according to the invention, of the hose coupling, it is expedient for the connector to have a groove-free face end region on the outer circumference.

It is conducive to the free hose end being pushed easily onto the connector of the hose coupling according to the invention if the groove-free face end region of the connector is in the form of a push-on cone and, for this purpose, tapers in preferably conical fashion toward the face end of the connector.

In order that the hose inner circumference is pressed in a particularly effective manner into the retention grooves which are provided on the connector and which serve as retention profiling, it is advantageous for the hose end that has been pushed onto the profiled coupling end to be retained thereon by means of a crimp sleeve which encompasses the hose end.

A particularly advantageous refinement of the invention provides that the connector sections of the connector which adjoin the groove long sides and/or separate the groove long sides of the retention grooves arranged on adjacent circumferential lines from one another project in the manner of ribs. Such an embodiment according to the invention offers the advantage that a hose coupling of said type, despite a relatively short connector, nevertheless offers the same axial retention forces for the hose and is simultaneously also capable of absorbing the torsional retention forces. In this embodiment, the retention grooves which are arranged approximately in a line in the connector longitudinal direction and which practically form a quadrilateral surface are spaced apart from one another by a rib which is of encircling form or which is formed with interruptions in an encircling manner, which rib jointly contributes to ensuring the axial fixing between the hose and the connector despite the relatively short structural length and the consequently reduced space for further encircling retention ribs.

BRIEF DESCRIPTION OF THE DRAWINGS

The following detailed description of the preferred embodiment of the present invention will be better understood when read in conjunction with the appended drawings. For the purpose of illustrating the invention, there are shown in the drawings embodiments which are presently preferred. It is understood, however, that the invention is not limited to the precise arrangements and instrumentalities shown. In the drawings:

FIG. 1 shows, in a perspective illustration, a hose coupling which has a connector which has a retention profiling on the outer circumference at least in one connector subregion, which retention profiling is formed by a multiplicity of retention grooves, FIG. 2 shows a hose coupling designed as in FIG. 1 in a longitudinal section, onto the connector of which hose coupling there has been pushed a hose end of a flexible hose line, wherein the hose end is held on the connector by means of a crimp sleeve which encompasses the hose end in the region of the profiled coupling end, FIG. 3 shows the hose coupling from FIG. 2 in a longitudinal section rotated slightly in the circumferential direction, FIG. 4 shows the hose coupling already shown in FIGS. 2 and 3, with the hose end encompassed by the crimp sleeve, in a longitudinal section, FIG. 5 shows the hose coupling from FIGS. 2 to 4 in a cross section through section plane V-V, FIG. 6 shows the connector of a hose coupling in a partial longitudinal section, wherein the connector bears a multiplicity of retention grooves which are provided on adjacent circumferential lines in lines arranged axially parallel to the connector longitudinal axis, FIG. 7 shows, in a schematic illustration, a cross section through the connector as per FIG. 6, with the section line of the partial longitudinal section shown in FIG. 6 being indicated, FIG. 8 shows the connector from FIGS. 6 and 7 in a side view, FIG. 9 shows the connector from FIGS. 6 to 8 in a perspective side view, in a view directed toward the free connector end of said connector, FIG. 10 shows a connector with a retention profiling provided from a multiplicity of retention grooves, wherein said retention grooves, arranged on adjacent circumferential lines, are arranged offset with respect to one another, FIG. 11 shows the connector from FIG. 10 in a perspective view from below of the free connector end, FIG. 12 shows, in a side view, a connector designed similarly to that in FIGS. 6 to 9, FIG. 13 shows the connector from FIG. 12 in a perspective view from below of the free connector end, FIG. 14 shows, in a side view, a connector designed similarly to that in FIG. 10, FIG. 15 shows the connector from FIG. 14 in a perspective view from below of the free connector end.

DETAILED DESCRIPTION OF THE PREFERRED EMBODIMENTS

Figure 16:
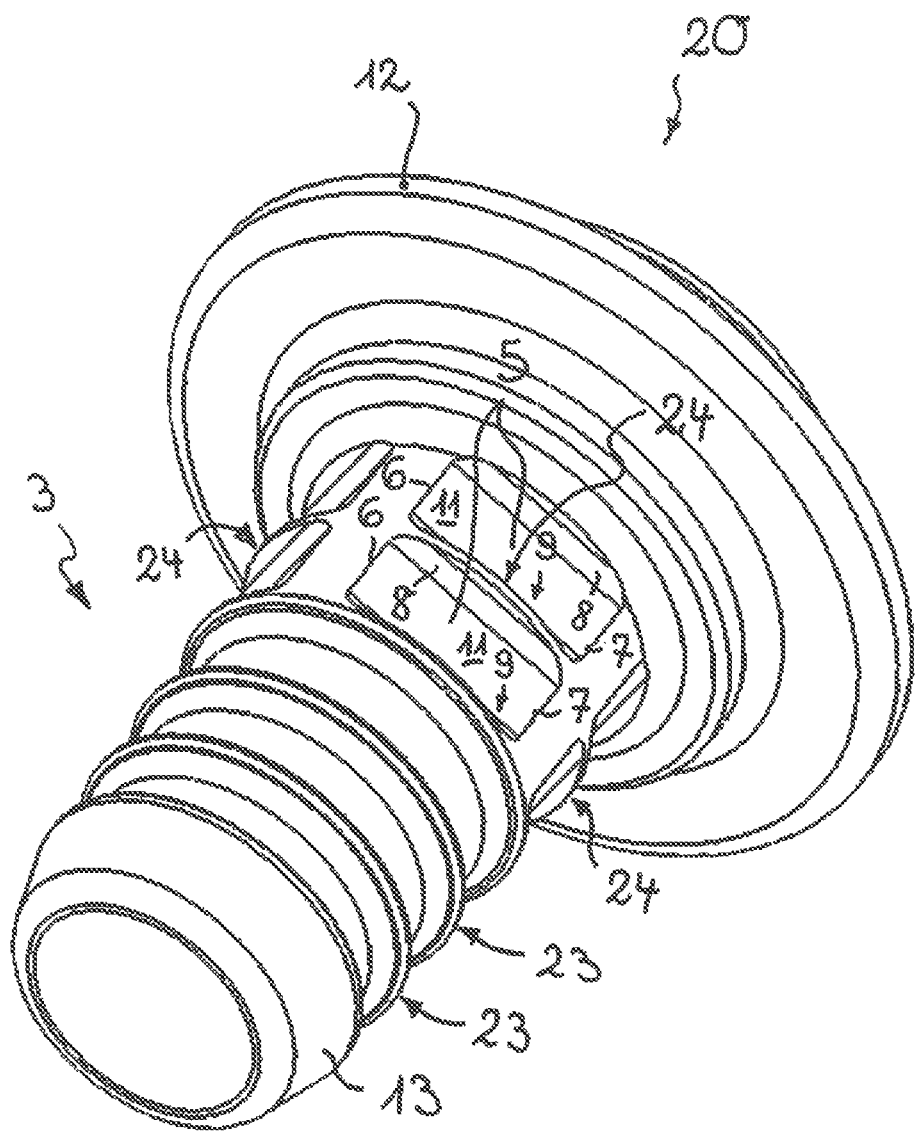
FIG. 16 shows a further embodiment according to the invention of a hose coupling in a perspective illustration, in a view directed toward the connector which is designed for a flexible hose to be pushed thereon.

FIGS. 1 to 24 illustrate various embodiments 1, 20 of a hose coupling which serves for the connection of a flexible hose 2 for example to an angle valve or to a sanitary outlet fitting or similar water consumption point. The hose coupling 1, 20, which is of sleeve-shaped form, has, on at least one coupling end, a connector 3 which bears a retention profiling on the outer circumference at least in one connector subregion.

As can be seen in FIGS. 2 to 5 and 21 to 24, a hose end 4 of the flexible hose 2 can be pushed onto the at least one profiled coupling end. The retention profiling provided on the connector 3 of the hose coupling 1 is formed by at least one, and preferably—as is the case here—multiple, retention groove(s) 5 which are provided on the outer circumference of the connector 3. Each of said retention grooves 5, formed as recesses in the connector outer circumference, has groove narrow sides 6, 7 oriented in the connector longitudinal direction and groove long sides 8, 9 oriented in the connector circumferential direction.

In each case one subset of the retention grooves 5 is arranged on a common connector circumferential line. In this case, the adjacent groove narrow sides 6, 7 of mutually adjacent retention grooves 5 are spaced apart from one another. Whereas the retention grooves 5 arranged on one of the circumferential lines in the case of the connector shown in FIGS. 6 to 9 and 16 to 24 define a quadrilateral connector cross section, the corresponding retention grooves 5 arranged on one of the circumferential lines in the embodiments shown in FIGS. 12 to 15 form a hexagonal connector cross section. In FIGS. 6 to 9 and 12 to 14, it can be seen that the retention grooves 5 arranged on adjacent circumferential lines may be provided in lines arranged axially parallel to the connector longitudinal axis. By contrast, it can be seen from FIGS. 1, 10 to 11 and 14 to 15 that the retention grooves 5 arranged on adjacent circumferential lines may also be arranged offset with respect to one another such that adjacent groove narrow sides 6, 7 of retention grooves 5 arranged on a common circumferential line are arranged approximately centrally with respect to a retention groove 5 provided on an adjacent circumferential line.

In FIGS. 1, 6 and 8 to 24, it can be seen that the connector 3 may have a groove-free face end region 13 on the outer circumference. To make it possible for the hose end 4 of the flexible hose 2 to be pushed onto the connector 3 easily and with little effort, it is advantageous for the groove-free face end region 13 to be in the form of a push-on cone, and for this purpose, to taper in preferably conical fashion toward the face end. In order that the elastic material of the flexible hose 2 can become well embedded into the retention grooves 5 which serve as retention profiling, a crimp sleeve 10 is provided which encompasses the hose end 4, which is pushed onto the profiled coupling end, of the hose 2. Said crimp sleeve 10 can be deformed or reshaped from an expanded initial position (not shown in any more detail here) into the retention position of reduced cross section shown in FIGS. 2 to 4. The hose coupling 1 may bear a connection thread on its coupling end facing away from the connector 3. Opposite, on their coupling end facing away from the connector 3, the hose couplings 1 illustrated here have an annular flange 12 which is engaged behind by a sleeve nut (not shown in any more detail here) and through the passage opening of which the connector 3 extends. To make it possible for the free hose ends of two adjacent flexible hose lines to be connected to one another, the hose coupling may also have in each case one connector on both coupling ends thereof.

FIGS. 16 to 24 illustrate a hose coupling 20 which likewise serves for the connection of a flexible hose 2 for example to an angle valve or to a sanitary outlet fitting or similar water consumption point. In this case, too, the hose coupling 20 has a radially protruding encircling annular flange 12. Proceeding from the coupling end which bears the hose end, there is mounted onto the hose coupling 20 a sleeve nut 21 whose opening edge, which delimits the passage opening of the sleeve nut 21, interacts with the annular flange 12.

The hose coupling 20, which in this case is likewise of sleeve-shaped form, has, at one coupling end thereof, which coupling end faces toward the hose 2, a connector 3 with a retention profiling which, in this case, is provided on the outer circumference in a connector subregion facing away from the groove-free face end region 13.

The hose end 4 of the hose 2, which in this case has a metal braiding 22 around the outer circumference, is pushed onto the groove-free face end region, which forms said one coupling end, of the hose coupling 20. The groove-free face end region 13 of the connector 3 is, for this purpose, in the form of a push-on cone, and tapers in preferably conical fashion toward the face end.

The retention profiling provided in that connector subregion which faces away from the coupling end is formed by at least one retention groove 5 which is formed as a recess in the connector and which is provided on the outer circumference of the connector 3 and which has groove long sides 8, 9 oriented in the connector circumferential direction and groove narrow sides 6, 7 oriented in the connector longitudinal direction. At least one retention rib 23 which is oriented in the connector circumferential direction is provided between said retention profiling, which is formed by the retention grooves 5, and the coupling end. In the exemplary embodiment shown in FIGS. 16 to 24, two retention ribs 23 which are spaced apart from one another are arranged between the retention profiling and the coupling end. Said retention ribs 23 are in this case formed in an encircling manner around the connector 3.

Figure 19:
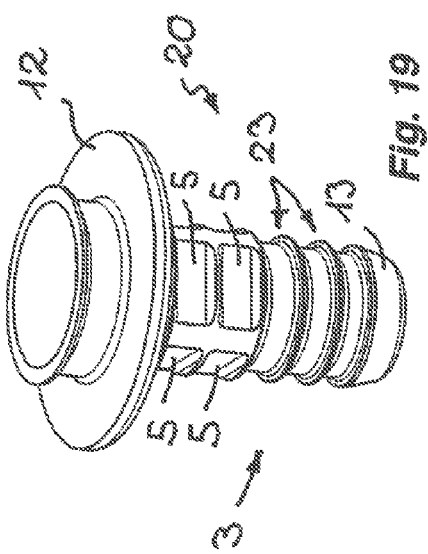
FIG. 19 shows the hose coupling from FIGS. 16 to 18 in a perspective side view, in a view directed toward the other coupling end in relation to FIG. 17.
Figure 20:
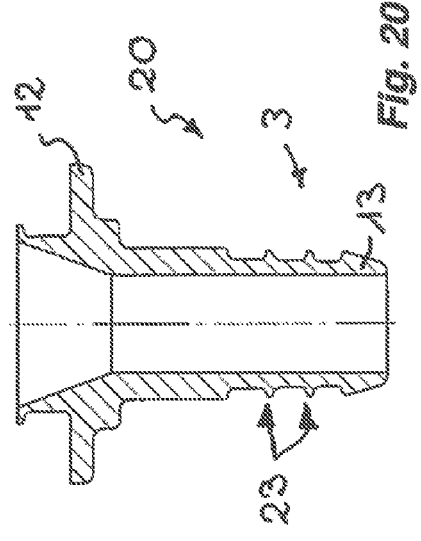
FIG. 20 shows the hose coupling from FIGS. 16 to 19 in a longitudinal section, wherein that connector subregion which has the retention profiling is in this case shown in a section whose section plane lies between the retention grooves.
Figure 17:
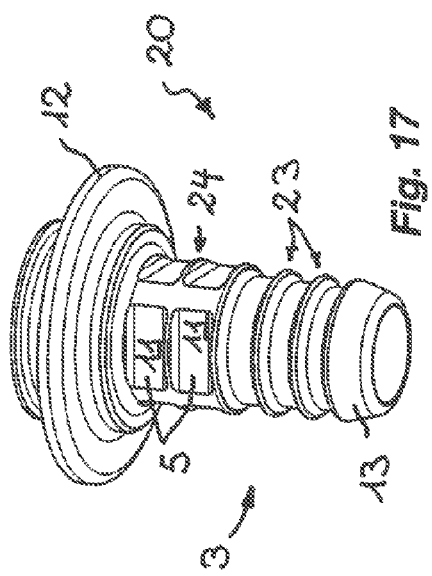
FIG. 17 shows the hose coupling from FIG. 16 in a similar perspective side view.
Figure 18:
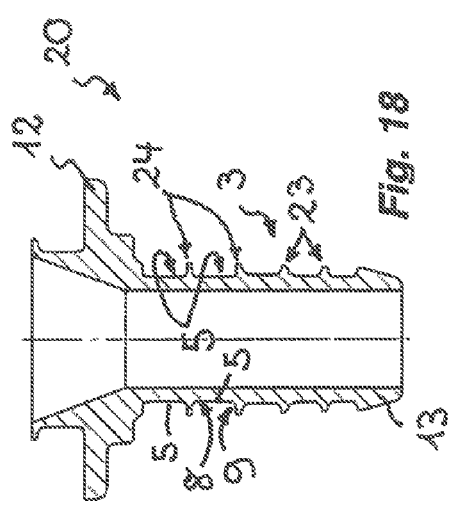
FIG. 18 shows the hose coupling from FIGS. 16 and 17 in a longitudinal section, wherein, in this longitudinal section, the retention grooves, provided on the connector, of a retention profiling are also shown in section.
Figure 24:
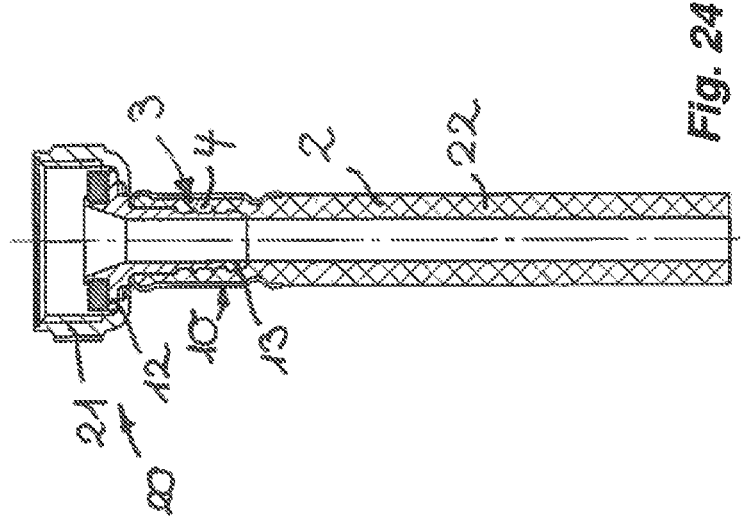
FIG. 24 shows the hose coupling from FIGS. 16 to 23 in a longitudinal section rotated through 45° in relation to FIG. 23.
Figure 23:
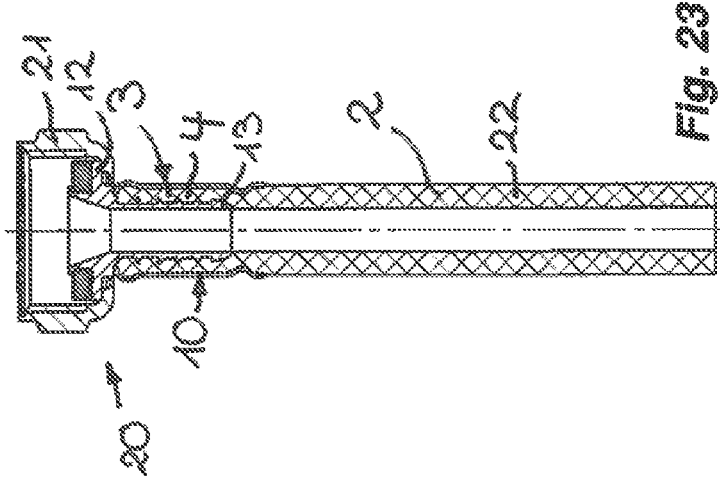
FIG. 23 shows the hose coupling from FIGS. 16 to 22 in a longitudinal section, wherein, in this longitudinal section, the retention grooves of a retention profiling are also shown in section.
Figure 21:
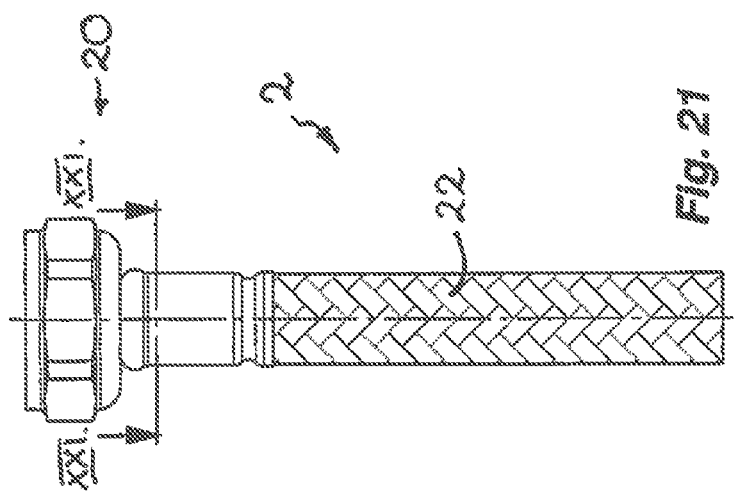
FIG. 21 shows the hose coupling from FIGS. 16 to 20 in a side view, wherein in this case, a hose end of a flexible hose line has been pushed onto the connector of said hose coupling, and wherein the hose coupling extends through the passage opening of a sleeve nut, by means of which sleeve nut the hose coupling can be fastened to the adjacent connection piece of a hose line (not shown in any more detail here)
Figure 22:
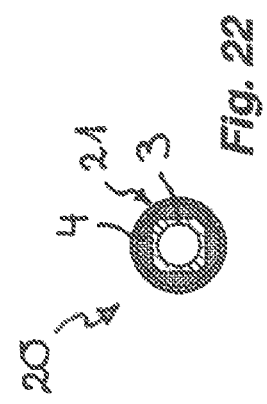
FIG. 22 shows the hose coupling from FIGS. 16 to 21 connected to the hose end of a flexible hose, in a cross section through the section plane XXI-XXI from FIG. 21.

In FIGS. 16, 17 and 19, it can be seen that the retention grooves 5 on the connector 3 of the hose coupling 20 have a groove base, which in this case is of flat form but could also be of concave or convex form. The retention profiling provided in the connector subregion of the hose coupling 20 has, in this case, at least two and in particular four retention grooves 5 which are each arranged approximately on a common circumferential line. In this case, the retention grooves 5 arranged on a common circumferential line are arranged so as to be distributed at uniform intervals over the connector circumference of the connector 3. The connector subregion has, in this case, a multiplicity of retention grooves 5 arranged on at least two circumferential lines, wherein the groove long sides, facing toward one another, of the retention grooves arranged on the adjacent circumferential lines are spaced apart from one another. In this case, the retention grooves arranged on the adjacent circumferential lines are provided in lines arranged axially parallel to the connector longitudinal axis. The retention grooves 5 positioned relative to one another in this way define a substantially quadrilateral connector cross section of the connector in the profiled connector subregion. In FIGS. 16, 17 and 19, it can be clearly seen that that connector section 24 of the connector 3 which separates the groove long sides of the retention grooves 5 arranged on adjacent circumferential lines from one another projects in the manner of a rib. In this case, said connector sections 24 which project in the manner of a rib may also taper in the radially outward direction in order that—like the retention ribs 23—they engage into the inner circumference in the hose interior of the hose 2 in a particularly effective manner.

LIST OF REFERENCE NUMERALS

1 Hose coupling
2 Hose
3 Connector
4 Hose end
5 Retention groove
6 Groove narrow side
7 Groove narrow side
8 Groove long side
9 Groove long side
10 Crimp sleeve
11 Groove base
12 Annular flange
13 Groove-free face end region
20 Hose coupling (as per FIGS. 16 to 24)
21 Sleeve nut
22 Metal braiding
23 Retention ribs
24 Connector section (between the adjacent retention grooves 5 which are spaced apart from one another in the connector longitudinal direction)

What is claimed is:

1. A hose coupling (1) comprising a sleeve-shaped form and which, at at least one coupling end, has a connector (3) with a retention profiling provided on the outer circumference at least in one connector subregion, onto which coupling end a hose end (4) of a flexible hose (2) can be pushed, wherein the retention profiling is formed by at least one retention groove (5) which is provided on the outer circumference of the connector (3) and which has groove long sides (8, 9) oriented in the connector circumferential direction and groove narrow sides (6, 7) oriented in the connector longitudinal direction, and wherein the at least one retention groove (5) has a groove base (11) which is of flat form, wherein the connector (3) has the retention profiling in a connector subregion facing away from the coupling end, and wherein at least one retention rib (23) oriented in the connector circumferential direction is provided between said retention profiling and the coupling end, the at least one retention rib (23) is of encircling form.

2. The hose coupling as claimed in claim 1, wherein the retention profiling has at least two retention grooves (5), the adjacent groove narrow sides (6, 7) of which are spaced apart from one another.

3. The hose coupling as claimed in claim 1, wherein the retention profiling has at least two retention grooves (5) arranged approximately on a common circumferential line.

4. The hose coupling as claimed in claim 3, wherein the retention grooves (5) arranged on a common circumferential line are arranged so as to be distributed over the connector circumference at uniform intervals.

5. The hose coupling as claimed in claim 3, wherein the retention grooves (5) arranged on a common circumferential line define a substantially triangular, square, hexagonal or polygonal connector cross section.

6. The hose coupling as claimed in claim 3, wherein, in at least one subregion of the connector (3), retention grooves (5) are provided so as to be arranged on at least two circumferential lines, and wherein the groove long sides (8, 9), which face toward one another, of the retention grooves (5) arranged on adjacent circumferential lines are spaced apart from one another.

7. The hose coupling as claimed in claim 3, wherein the retention grooves (5) arranged on adjacent circumferential lines are provided in lines arranged axially parallel to the connector longitudinal axis.

8. The hose coupling as claimed in claim 1, wherein the hose end (4) that has been pushed onto the profiled coupling end is retained thereon by means of a crimp sleeve (10) which encompasses the hose end (4).

9. The hose coupling as claimed in claim 1, wherein the connector sections (24) of the connector (3) which adjoin the groove long sides (8, 9) and/or separate the groove long sides (8, 9) of the retention grooves (5) arranged on adjacent circumferential lines from one another project outward in the manner of ribs and taper in a radially outward direction.

10. A hose coupling (1) comprising a sleeve-shaped form and which, at at least one coupling end, has a connector (3) with a retention profiling provided on the outer circumference at least in one connector subregion, onto which coupling end a hose end (4) of a flexible hose (2) can be pushed, wherein the retention profiling is formed by at least one retention groove (5) which is provided on the outer circumference of the connector (3) and which has groove long sides (8, 9) oriented in the connector circumferential direction and groove narrow sides (6, 7) oriented in the connector longitudinal direction, and wherein the at least one retention groove (5) has a groove base (11) which is of flat form, wherein the connector (3) has the retention profiling in a connector subregion facing away from the coupling end, and wherein at least one retention rib (23) oriented in the connector circumferential direction is provided between said retention profiling and the coupling end, and wherein at least two retention ribs (23) which are spaced apart from one another are provided between the retention profiling and the coupling end.

11. A hose coupling (1) comprising a sleeve-shaped form and which, at at least one coupling end, has a connector (3) with a retention profiling provided on the outer circumference at least in one connector subregion, onto which coupling end a hose end (4) of a flexible hose (2) can be pushed, wherein the retention profiling is formed by at least one retention groove (5) which is provided on the outer circumference of the connector (3) and which has groove long sides (8, 9) oriented in the connector circumferential direction and groove narrow sides (6, 7) oriented in the connector longitudinal direction, and wherein the at least one retention groove (5) has a groove base (11) which is of flat form, wherein the retention profiling has at least two retention grooves (5) arranged approximately on a common circumferential line, and wherein the retention grooves (5) arranged on adjacent circumferential lines are arranged offset with respect to one another.

12. The hose coupling as claimed in claim 11, wherein the retention grooves (5) arranged on adjacent circumferential lines are arranged offset with respect to one another such that adjacent groove narrow sides (6, 7) of retention grooves (5) arranged on a common circumferential line are arranged approximately centrally with respect to a retention groove (5) provided on an adjacent circumferential line.

13. A hose coupling (1) comprising a sleeve-shaped form and which, at at least one coupling end, has a connector (3) with a retention profiling provided on the outer circumference at least in one connector subregion, onto which coupling end a hose end (4) of a flexible hose (2) can be pushed, wherein the retention profiling is formed by at least one retention groove (5) which is provided on the outer circumference of the connector (3) and which has groove long sides (8, 9) oriented in the connector circumferential direction and groove narrow sides (6, 7) oriented in the connector longitudinal direction, and wherein the at least one retention groove (5) has a groove base (11) which is of flat form, wherein the connector has a groove-free face end region (13) on the outer circumference and wherein the groove-free face end region (13) of the connector (3) is in the form of a push-on cone and tapers conically toward the face end.

* * * * *